United States Patent
Kang et al.

(10) Patent No.: US 7,274,554 B2
(45) Date of Patent: Sep. 25, 2007

(54) BATTERY PACK LOCKING APPARATUS FOR MOBILE COMMUNICATION TERMINALS

(75) Inventors: In-Han Kang, Seoul (KR); Bong-Do Kim, Suwon-si (KR); Jung-Chul Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 10/963,348

(22) Filed: Oct. 12, 2004

(65) Prior Publication Data
US 2005/0225933 A1  Oct. 13, 2005

(30) Foreign Application Priority Data
Apr. 9, 2004  (KR)  ............... 10-2004-0024312

(51) Int. Cl.
*H05K 5/00* (2006.01)
(52) U.S. Cl. ..................... 361/679; 361/686
(58) Field of Classification Search .......... 361/679, 361/686
See application file for complete search history.

(56) References Cited

U.S. PATENT DOCUMENTS 5,716,730 A    2/1998  Deguchi

FOREIGN PATENT DOCUMENTS

KR    2005-82819    8/2005

*Primary Examiner*—Yean-Hsi Chang
(74) *Attorney, Agent, or Firm*—The Farrell Law Firm (57) ABSTRACT

Disclosed herein is a battery pack locking apparatus for mobile communication terminals that is capable of detachably locking a battery pack to a terminal body of a mobile communication terminal. The battery pack locking apparatus includes a mounting groove formed at a prescribed position of the rear casing frame, a push locker unit mounted in the mounting groove such that the push locker unit can be moved toward the front and the rear of the terminal body when the push locker unit is pushed, a slide locker unit coupled with the push locker unit at the lower part of the push locker unit such that the slide locker unit can be slid toward the upper and lower ends of the terminal body, as the push locker unit is moved toward the front and the rear of the terminal body, for locking the battery pack to the battery pack locking space or popping the battery pack out of the battery pack locking space when the battery pack is unlocked from the battery pack locking space, and a coil spring mounted to the slide locker unit for providing an elastic force so that the push locker unit is moved toward the front and the rear of the terminal body and the slide locker unit is slid toward the upper and lower ends of the terminal body.

13 Claims, 11 Drawing Sheets

BATTERY PACK LOCKING APPARATUS FOR MOBILE COMMUNICATION TERMINALS

PRIORITY

This application claims priority to an application entitled "BATTERY PACK LOCKING APPARATUS FOR MOBILE COMMUNICATION TERMINALS", filed in the Korean Intellectual Property Office on Apr. 9, 2004 and assigned Ser. No. 2004-24312, the contents of which are hereby incorporated by reference.

BACKGROUND OF THE INVENTION

1. Field of the Invention

The present invention relates to a battery pack locking apparatus for mobile communication terminals, and more particularly to an apparatus that is capable of detachably locking a battery pack to a terminal body of a mobile communication terminal.

2. Description of the Related Art

Figure 1:
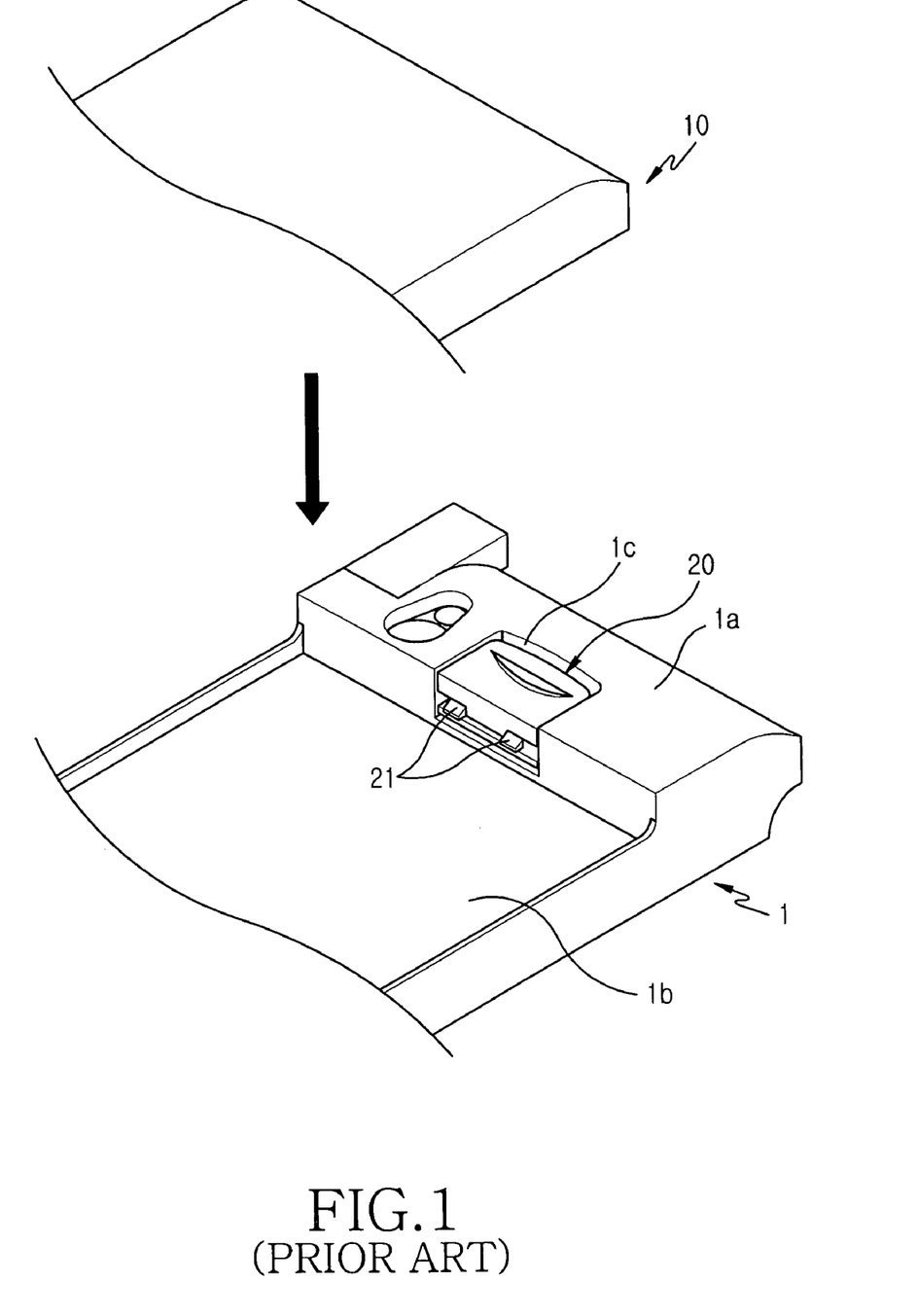
FIG. 1 is a perspective view showing a conventional battery pack locking apparatus for mobile communication terminals.

Generally, a battery pack 10, which serves to supply electric power to a mobile communication terminal, is detachably locked to the rear part of a terminal body 1 of the mobile communication terminal, as shown in FIG. 1. The battery pack 10 is locked to or detached from the terminal body 1 by means of a battery pack locking apparatus 20 mounted to the terminal body 1.

The battery pack 10 may be locked to the rear part of the terminal body 1 through the use of a slide-type locking mechanism for slidably locking pack 10 to the rear part of the terminal body 1 by means of guide ribs and a latching member, so that the battery pack 10 is pushed toward the terminal body 1 until the battery pack 10 is completely locked to the terminal body 1.

The battery pack 10 is typically provided at front and rear parts of the lower end thereof with electric contacts (not shown) such that at least one pair of the electric contacts are exposed. The electric contacts provided on the front surface of the battery pack 10 contact electric contacts (not shown) formed on an electric charger when the battery pack 10 is to be charged while the electric contacts provided at the rear part of the battery pack 10 contact electric contacts (not shown) formed on the rear surface of the terminal body 1.

As shown in FIG. 1, the battery pack 10 is detachably locked to the rear part of the terminal body 1 by means of the conventional battery pack locking apparatus 20 mounted to the terminal body 1, specifically to a rear casing frame 1a of the terminal body 1.

The terminal body 1 is provided with a battery pack space 1b formed at the rear casing frame la. At one end of the battery pack space 1b is formed electric contacts (not shown). At a prescribed position of the rear casing frame 1a adjacent to the other end of the battery pack locking space 1b is formed a mounting groove 1c, in which the battery pack apparatus 10 is mounted for locking the battery pack 10 to the terminal body 1.

When the battery pack 10 constructed as described above is to be locked to the terminal body 1, the battery pack 10 is fitted into the battery pack space 1b of the terminal body 1. At this time, lockers 21 of the battery pack locking apparatus 20 are engaged into an engaging groove 11 formed at the battery pack 10 (See FIG. 2). Consequently, the battery pack 10 is securely locked to the terminal body 1 by means of the lockers 21.

When the battery pack 10 is to be detached from the terminal body 1, the lockers 21 are pulled toward the upper end of the terminal body 1, by sliding the lockers away from the battery pack. As a result, the lockers 21 are disengaged from the engaging groove 11 of the battery pack 10, and therefore the battery pack 10 may be detached from the terminal body 1.

The mounting groove 1c has a sufficient space defined therein so that the lockers 21 can be slid toward the upper and lower ends of the terminal body 1.

Figure 2:
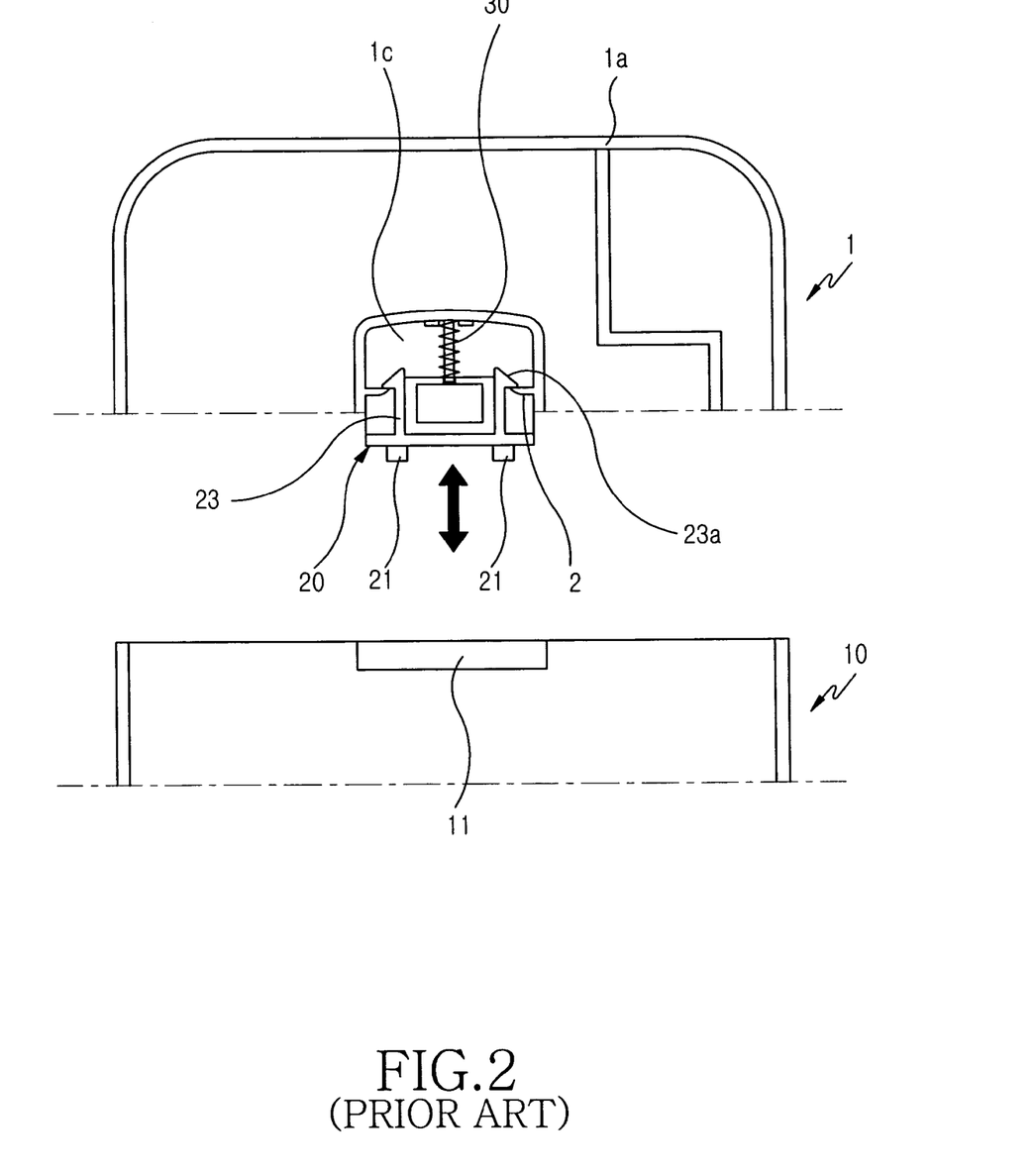
FIG. 2 is a plan view, in section, showing the construction of the conventional battery pack locking apparatus for mobile communication terminals shown in FIG. 1.

FIG. 2 is a cross-sectional view showing the construction of the conventional battery pack locking apparatus for mobile communication terminals shown in FIG. 1. As shown in FIG. 2, the conventional battery pack locking apparatus 20 includes two guide ribs 23, which are mounted to the rear casing frame 1a to guide the guide ribs 23 toward the front and the rear of the terminal body 1.

At one end of each guide rib 23 is formed a hooking member 23a, which is by means of a corresponding catching protrusion 2 formed on the rear casing frame 1a. Consequently, separation of the lockers 21 from the engaging groove 11 of the battery pack 10 is effectively prevented during a sliding movement of the lockers 21 toward the upper/lower end of the terminal body 1 once the lockers 21 are engaged into the engaging groove 11. The battery pack locking apparatus 20 further includes an elastic member, such as a spring 30, for providing a prescribed elastic force to the lockers 21. The spring 30 presses against the lockers while being supported by means of the rear casing frame 1a.

With the conventional battery pack locking apparatus for mobile communication terminals, however, it is necessary that a sufficient space be provided in the mounting groove, in which the lockers can be slid toward the upper and lower ends of the terminal body. As a result, the size of the terminal body of the mobile communication terminal is increased, and the external appearance of the mobile communication terminal is poor. As a further result, the structure of the battery pack locking apparatus is very complicated, which deteriorates productivity and reliability of the battery pack locking apparatus. The space groove must also be kept clear of debris.

Also, it is necessary that the lockers be pulled toward the upper end of the terminal body while the lockers are pressed by means of a fingernail of a user when the battery pack is to be detached from the terminal body. As a result, the fingernail of the user may be injured.

SUMMARY OF THE INVENTION

Therefore, the present invention has been made in view of the above problems, and it is an object of the present invention to provide a battery pack locking apparatus for mobile communication terminals that is capable of securely locking a battery pack to a terminal body of a mobile communication terminal and easily detaching the battery pack from the terminal body once the battery pack locking apparatus is simply pushed.

It is another object of the present invention to provide a battery pack locking apparatus for mobile communication terminals that is capable of securely locking a battery pack to a terminal body of a mobile communication terminal and easily detaching the battery pack from the terminal body once the battery pack locking apparatus is simply pushed, whereby the structure of the mobile communication terminal is simplified, productivity and reliability of the mobile communication terminal are guaranteed, and the mobile communication terminal has an aesthetically pleasing external appearance.

In accordance with the present invention, the above and other objects can be accomplished by the provision of a battery pack locking apparatus for locking a battery pack to a battery pack space formed at a rear casing frame of a terminal body of a mobile communication terminal, wherein the battery pack locking apparatus includes a mounting groove formed on the rear casing frame; a push locker unit mounted in the mounting groove such that the push locker unit can be moved toward the front and the rear of the terminal body when the push locker unit is pushed; a slide locker unit coupled with the push locker unit at the lower part of the push locker unit such that the slide locker unit can be slid toward the upper and lower ends of the terminal body, as the push locker unit is moved toward the front and the rear of the terminal body, for locking the battery pack to the battery pack space or popping the battery pack out of the battery pack space when the battery pack is unlocked from the battery pack space; and a coil spring mounted to the slide locker unit for providing an elastic force so that the push locker unit is moved toward the front and the rear of the terminal body and the slide locker unit is slid toward the upper and lower ends of the terminal body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of the present invention will be described in detail with reference to the annexed drawings. In the drawings, the same or similar elements are denoted by the same reference numerals even though they are depicted in different drawings.

As shown in FIGS. 3 to 11, a battery pack locking apparatus 100 for mobile communication terminal comprises a mounting groove 200, a push locker unit 300, a slide locker unit 400, and a coil spring 500.

Figure 3:
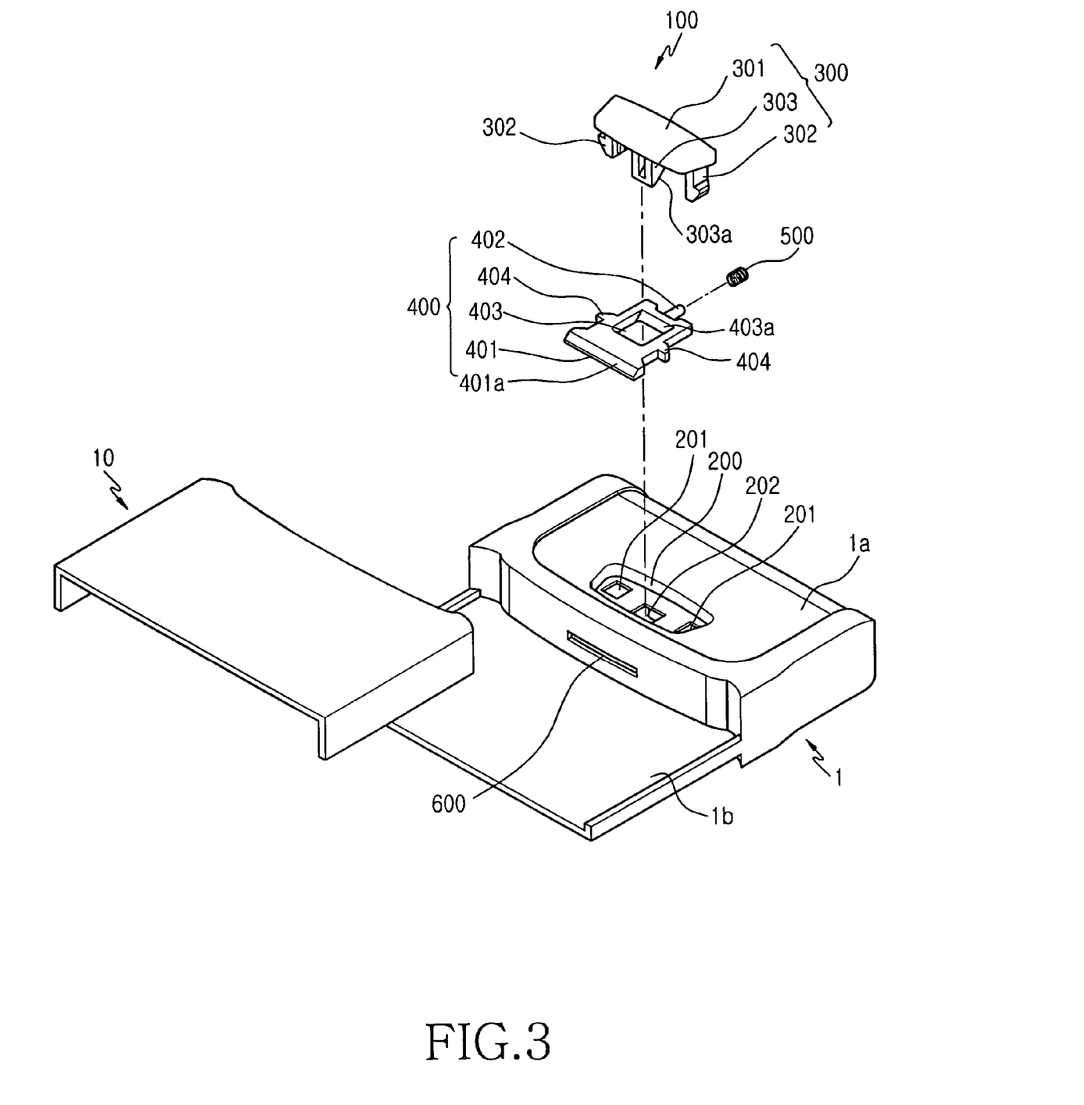
FIG. 3 is an exploded perspective view showing the construction of a battery pack locking apparatus for mobile communication terminals according to a preferred embodiment of the present invention.

The mounting groove 200 is formed at a prescribed position of a rear casing frame 1a of a terminal body 1 such that the push locker unit 300 is mounted in the mounting groove 200. The push locker unit 300 is mounted in the mounting groove 200 such that the push locker unit 300 can be moved toward the front and the rear of the terminal body 1 when the push locker unit 300 is pushed.

The slide locker unit 400 is coupled with the push locker unit 300 at the lower part of the push locker unit 300 such that the slide locker unit 400 can be slid toward the upper and lower ends of the terminal body 1, as the push locker unit 300 is moved toward the front and the rear of the terminal body 1, for locking the battery pack 10 to the battery pack space 1b formed at the rear casing frame 1a of the terminal body 1 or unlocking the battery pack 10 from the battery pack space 1b and then popping the battery pack 10 out of the battery pack space 1b immediately when the battery pack 10 is unlocked from the battery pack space 1b.

The coil spring 500 is mounted to the slide locker unit 400 for providing an elastic force, by which the push locker unit 300 is moved toward the front and the rear of the terminal body 1 and the slide locker unit 400 is slid toward the upper and lower ends of the terminal body 1.

The mounting groove 200 is provided at both sides thereof with two latch holes 201, respectively, through which hook members 302 formed on the push locker unit 300 are inserted, respectively, such that the hook members 302 are retained within the corresponding latch holes 201. The mounting groove 200 is provided at a middle part thereof with a through-hole 202, through which a guide protrusion 303 formed on the push locker unit 300 is inserted.

Figure 8:
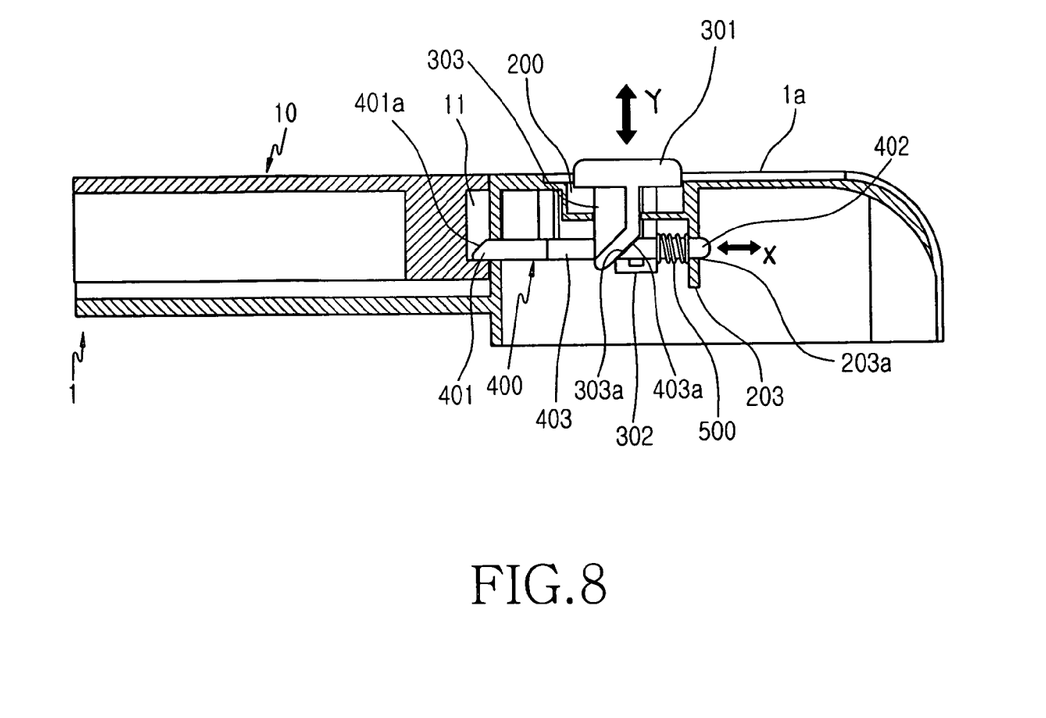
FIG. 8 is a side cross-sectional view of the battery pack locking apparatus according to the preferred embodiment of the present invention shown in FIG. 3 before the battery pack locking apparatus is being operated.

As seen in FIG. 8, the upper end of the bottom of the mounting groove 200 is provided a supporting plate 203, which extends toward the front of the terminal body 1 for movably supporting a spring protrusion 402 formed on the slide locker unit 400. On the supporting plate 203 is formed a plate-side through-hole 203a, through which the spring protrusion 402 is inserted such that the slide locker unit 400 can be slid toward the upper and lower ends of the terminal body 1.

Figure 7:
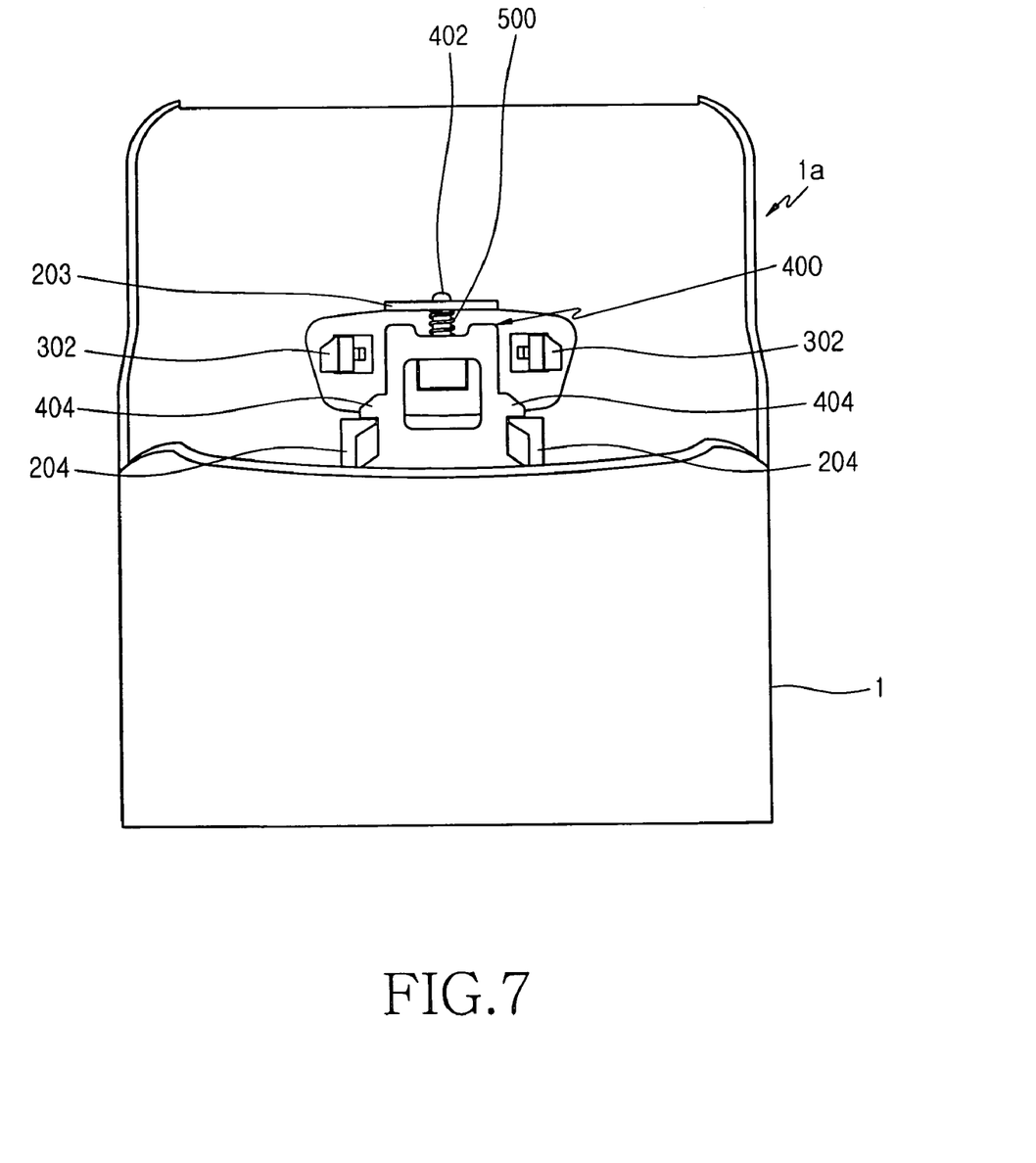
FIG. 7 is a plan view in partial cut-away showing the rear part of the battery pack locking apparatus according to the preferred embodiment of the present invention shown in FIG. 3.

Adjacent to the mounting groove 200 are formed two separation-preventing protrusions 204, which are securely engaged with latch protrusions 404 formed on the slide locker unit 400, respectively, for preventing separation of the slide locker unit 400 from the mounting groove 200, as best seen in FIG. 7.

Figure 4:
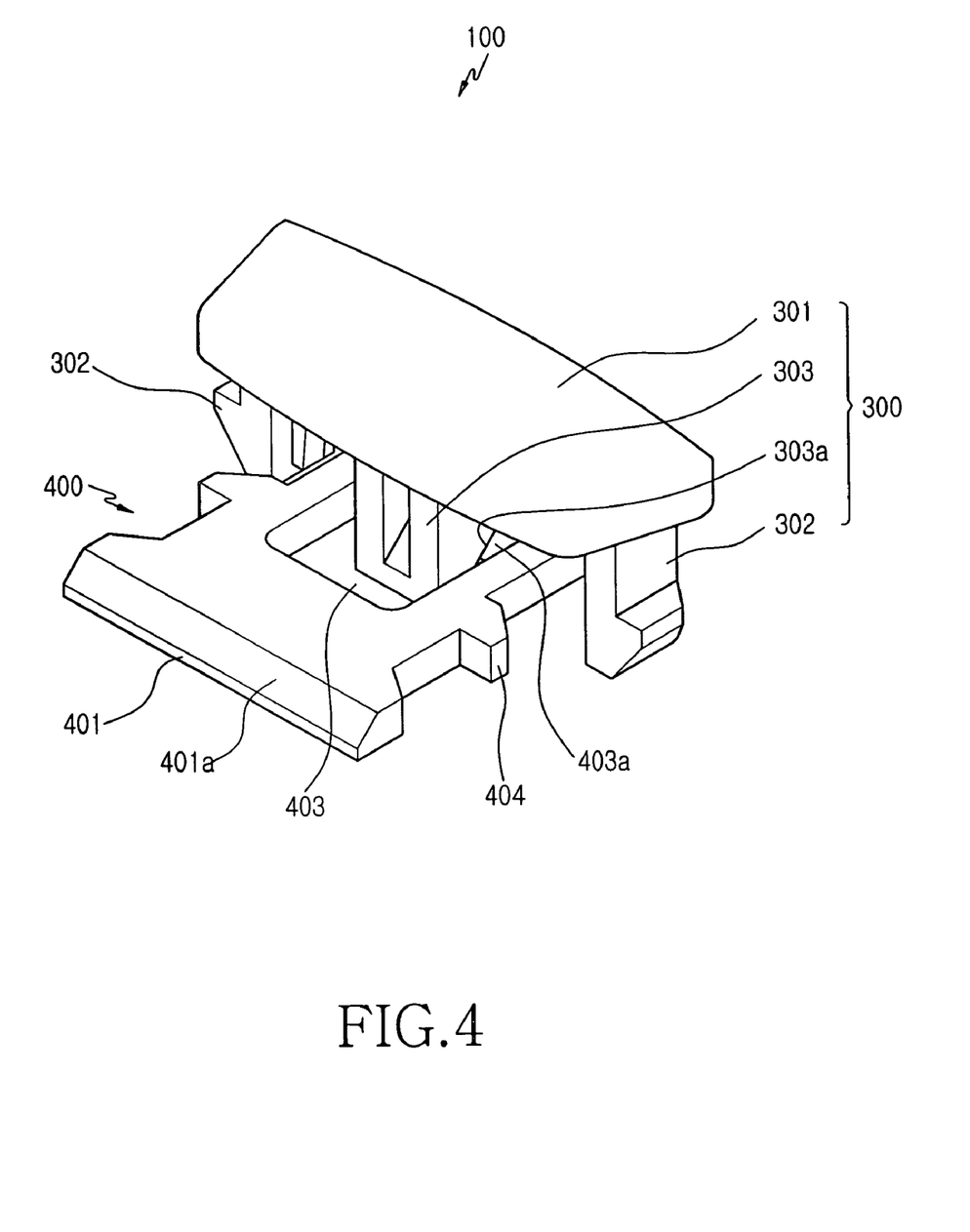
FIG. 4 is a perspective view showing a push locker unit and a slide locker unit of the battery pack locking apparatus according to the preferred embodiment of the present invention shown in FIG. 3.
Figure 5:
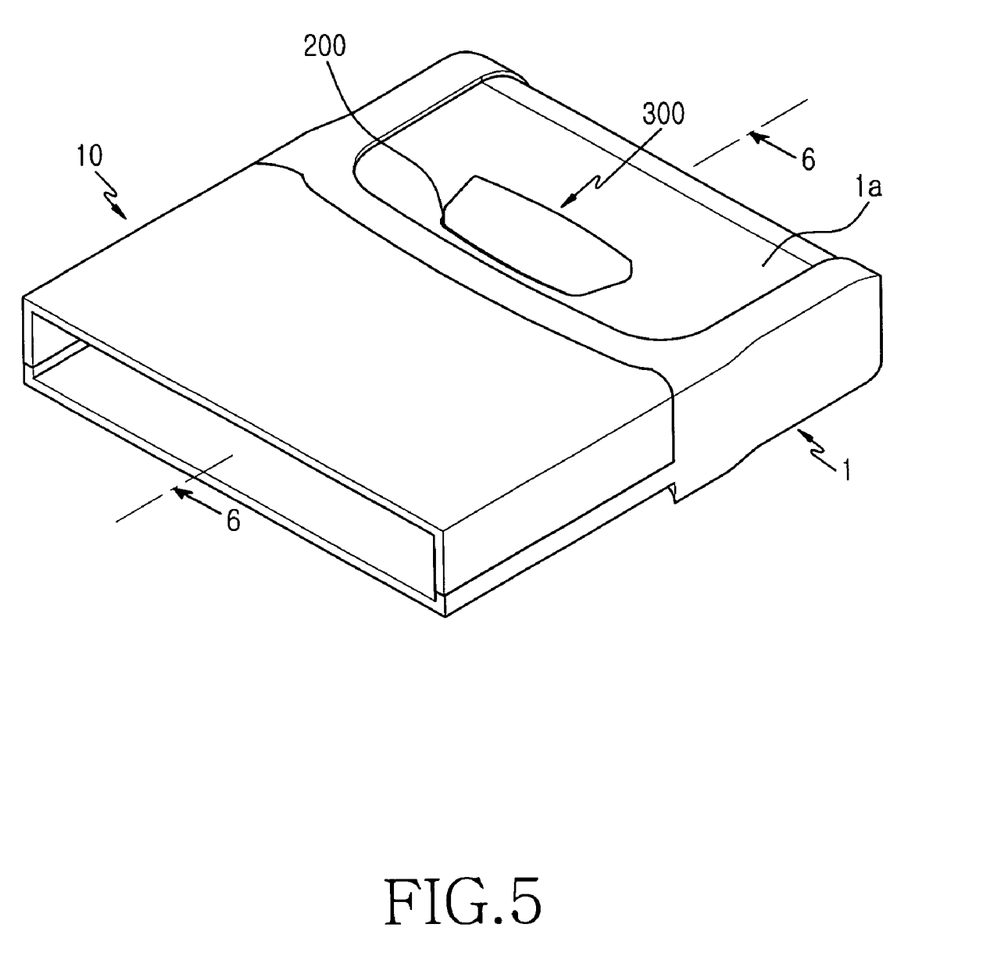
FIG. 5 is a perspective view showing the battery pack locking apparatus according to the preferred embodiment of the present invention shown in FIG. 3 mounted to a terminal body of a mobile communication terminal.

The push locker unit 300 comprises a locker button 301, two hooking members 302, and guide protrusion 303. The locker button 301 is mounted in the mounting groove 200 while being exposed such that an external force can be applied to the locker button 301. The hook members 302 are formed at both sides of the bottom of the locker button 301 while extending from the locker button 301 such that the hook members 302 can be inserted through the latch holes 201 of the mounting groove 200, respectively, and then the hook members 302 can be retained within the corresponding latch holes 201.

The guide protrusion 303 is formed between the hook members 302 such that the guide protrusion 303 is inserted though the through-hole 202 formed through the middle part of the mounting groove 200, and is guided along a hole-side inclined surface 403a formed on the slide locker unit 400. On the guide protrusion 303 is formed a protrusion-side inclined surface 303a such that the guide protrusion 303 can be guided while the protrusion-side inclined surface 303a is in contact with the hole-side inclined surface 403a of the slide locker unit 400. At the middle part of the slide locker unit 400 is formed a guide hole 403, through which the guide protrusion 303 is inserted. Specifically, the hole-side inclined surface 403a is formed at the guide hole 403 such that the hole-side inclined surface 403a corresponds to the protrusion-side inclined surface 303a.

The slide locker unit 400 is provided at one end thereof with a hook 401, which is engaged into or disengaged from an engaging groove 11 formed on the battery pack 10 as the slide locking unit 400 is slid toward the upper and lower ends of the terminal body 1, as seen in FIG. 8. The slide locker unit 400 is provided at the other end thereof with a spring protrusion 402 extending in the longitudinal direction of the slide locker unit 400, on which the coil spring 500 is fitted.

The hook 401 has a guide surface 401a formed at one end thereof, along which the hook 401 is guided when the hook is engaged into or disengaged from the engaging groove 11 of the battery pack 10. The guide surface 401a of the hook 401 is inclined to facilitate sliding the hook 401 into the engaging groove 11 of the battery pack 10 or to facilitate sliding the hook 401 from the groove 11 to enable the battery pack to be popped from the battery pack space 1b.

At the rear casing frame 1a is formed a frame-side through-hole 600, through which the hook 401 is inserted toward the inside of the battery pack space 1b such that the hook can be engaged into the engaging groove 11 of the battery pack 10.

Operation of the battery pack locking apparatus for mobile communication terminals with the above-stated construction according to the present invention will now be described with reference to FIGS. 3 to 11. As shown in FIGS. 3 to 6, the battery pack locking apparatus 100 for mobile communication terminals includes the mounting groove 200, the push locker unit 300, the slide locker unit 400, and the coil spring 500. The mounting groove 200 is formed at a prescribed position of the rear casing frame 1a of the terminal body 1, and the push locker unit 300 is mounted in the mounting groove 200 such that the push locker unit 300 can be moved toward the front and the rear of the terminal body 1 when the push locker unit 300 is pushed. The slide locker unit 400 is coupled with the push locker unit 300 at the lower part of the push locker unit 300 such that the slide locker unit 400 can be slid toward the upper and lower ends of the terminal body 1 as the push locker unit 300 is moved toward the front and the rear of the terminal body 1 for popping the battery pack 10 out of the battery pack space 1b when the battery pack 10 is unlocked from the battery pack space 1b.

Figure 6:
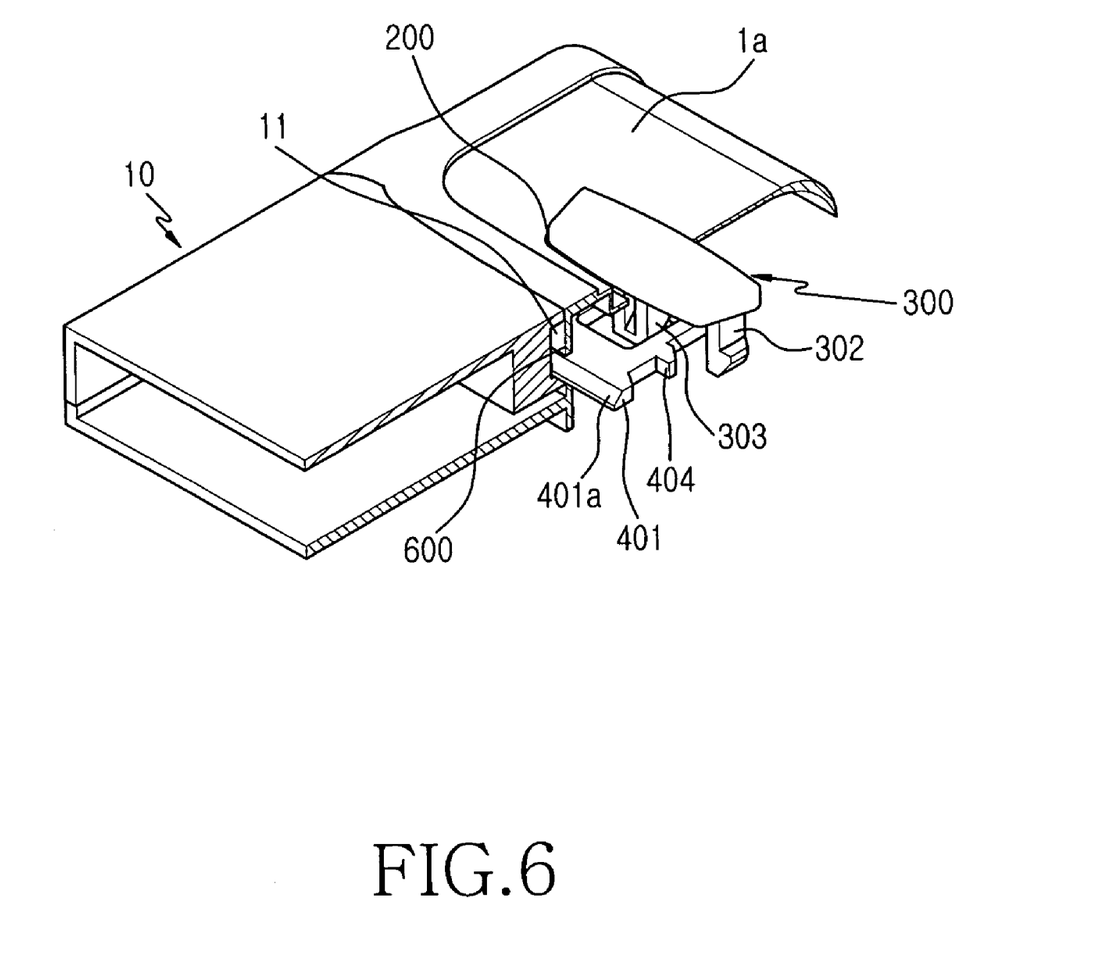
FIG. 6 is a side cross-sectional view taken along lines 6-6 of FIG. 5 of the battery pack locking apparatus mounted to the terminal body of the mobile communication terminal shown in FIG. 5.

The hook members 302 are formed at both sides of the bottom of the locker button 301 while extending from the locker button 301 such that the hook members 302 are inserted through the latch holes 201 of the mounting groove 200, respectively, and then the hooking members 302 are retained within the corresponding latch holes 201. The hook 401 is formed at one end of the slide locker unit 400 such that the hook 401 can be engaged into or disengaged from the engaging groove 11 of the battery pack 10 as the slide locking unit 400 is slid toward the upper and lower ends of the terminal body 1. As shown in FIG. 6, the hook 401 is inserted through the frame-side through-hole 600 formed at the rear casing frame 1a of the terminal body 1.

The spring protrusion 402 is formed at the other end of the slide locker unit 400 in the longitudinal direction of the slide locker unit 400 such that the coil spring 500 is fitted on the spring protrusion 402. The latch protrusions 404 are formed at both sides of the slide locker unit 400 so that separation of the slide locker unit 400 from the mounting groove 200 is prevented when the slide locker unit 400 is slid toward the upper and lower ends of the terminal body 1, as shown in FIG. 7. Consequently, the latch protrusions 404 are engaged with the separation-preventing protrusions 204 formed adjacent to the mounting groove 200 so that separation of the slide locker unit 400 from the mounting groove 200 is prevented.

The guide protrusion 303 formed at the middle part of the push locker unit 300 is inserted through the through-hole 202 formed at the middle part of the mounting groove 200. Also, the guide protrusion 303 is inserted through the guide hole 403 formed on the slide locker unit 400. The protrusion-side inclined surface 303a is formed on the guide protrusion 303, which corresponds to the hole-side inclined surface 403a formed at the guide hole 403, as shown in FIG. 4.

Figure 9:
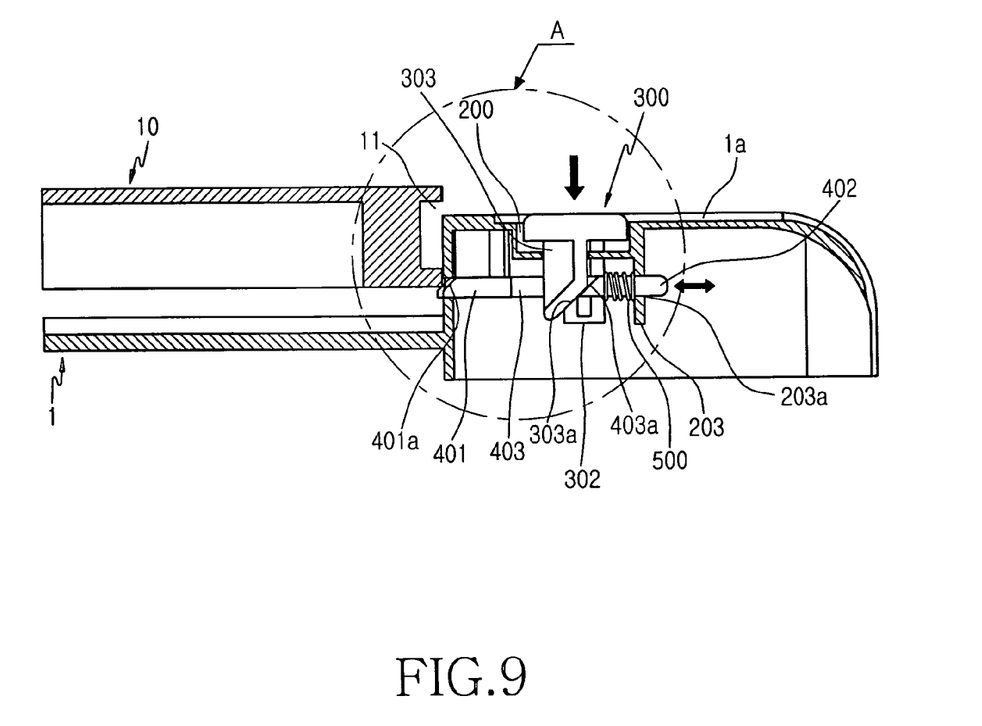
FIG. 9 is a side cross-sectional view of the battery pack locking apparatus according to the preferred embodiment of the present invention shown in FIG. 3 while the battery pack locking apparatus is operated.
Figure 10:
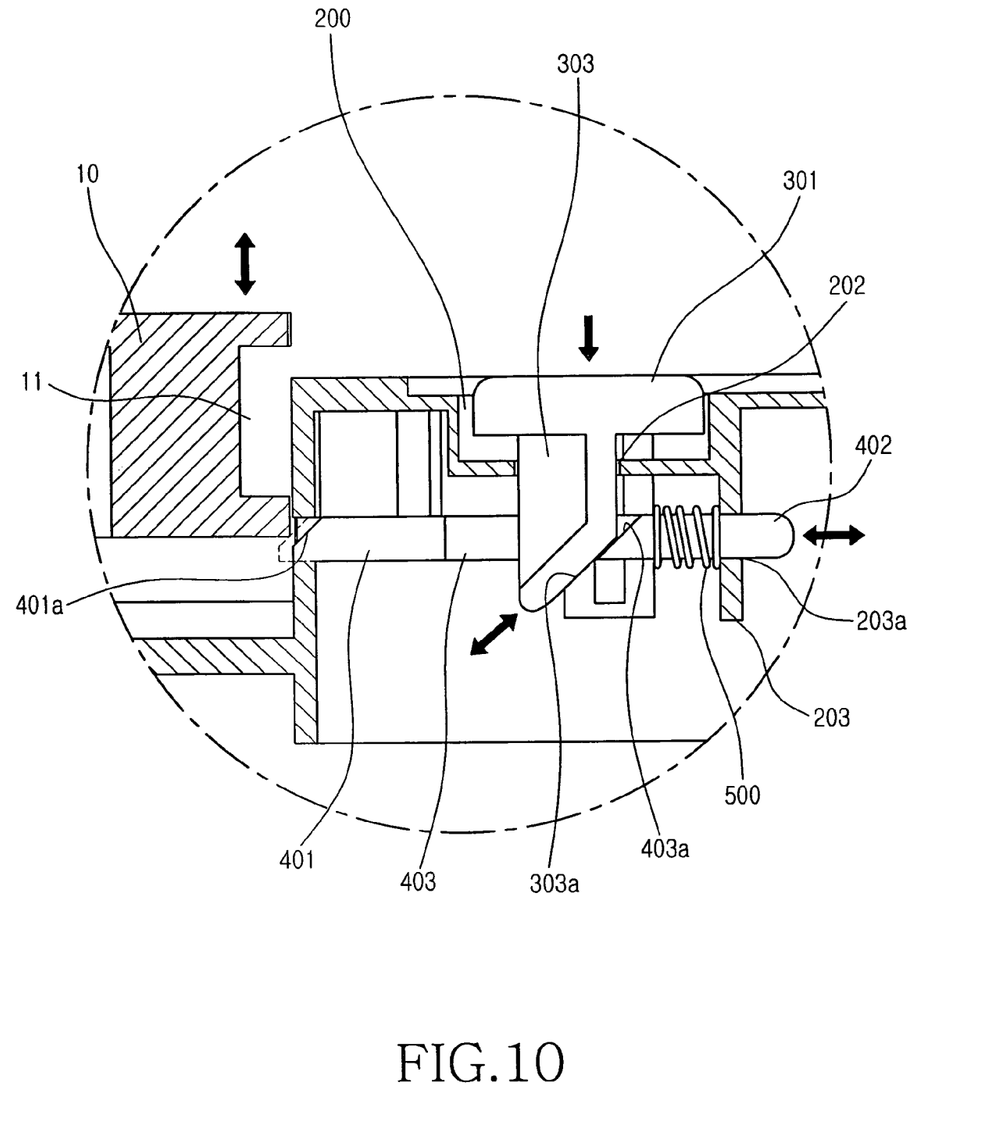
FIG. 10 is an enlarged side cross-sectional view of part A shown in FIG. 9.

As shown in FIGS. 8 to 11, when the battery pack 10 is to be detached from the battery pack space 1b of the rear casing frame 1a, as shown in FIGS. 8 and 9, the locker button 301 of the push locker unit 300 mounted in the mounting groove 200 is pushed by a user in the direction of Arrow Y so that the push locker unit 300 is moved toward the front of the terminal body 1. At this time, the slide locker unit 400 slides in the direction of Arrow X along the longitudinal axis of the terminal body 1, toward the upper end of the terminal body 1 by means of the guide protrusion 303 of the push locker unit 300 inserted in the guide hole 403 of the slide locker unit 400, as shown in FIGS. 9 and 10.

Since the protrusion-side inclined surface 303a of the guide protrusion 303 is in contact with the hole-side inclined surface 403a of the guide hole 403, as shown in FIG. 10, the protrusion-side inclined surface 303a is guided along the hole-side inclined surface 403a in the direction of Arrow Z as the guide protrusion 303 is moved toward the front of the terminal body 1. Consequently, the slide locker unit 400 is slid toward the upper end of the terminal body 1 in the direction of Arrow X.

At this time, the hook 401 of the slide locker unit 400 also slides so that the hook 401 is disengaged from the engaging groove 11 of the battery pack 10.

When the external force applied to the push button 301 of the push locker unit 300 is removed, the slide locker unit 400 is slid toward the lower end of the terminal body 1 by means of the elastic force of the coil spring 500 provided at the slide locker unit 400 in a direction opposite to Arrow X.

Figure 11:
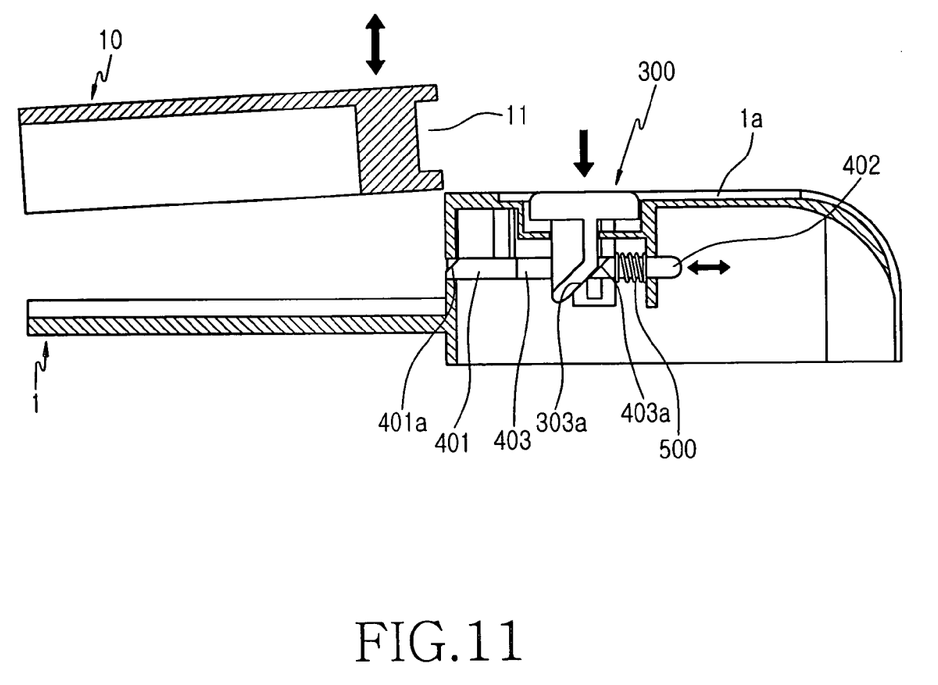
FIG. 11 is a side cross-sectional view of the battery pack locking apparatus according to the preferred embodiment of the present invention shown in FIG. 3 after the battery pack locking apparatus has been operated.

At one end of the hook 401 is formed the guide surface 401a, along which the battery pack 10 is guided so that the battery pack 10 is popped out of the battery pack space 1b toward the rear of the terminal body 1 when the hook 401 is disengaged from the engaging groove 11 of the battery pack 10. Consequently, the hook 401 is moved into the frame-side through-hole 600 when the hook 401 is disengaged from the engaging groove 11 of the battery pack 10, as shown in FIGS. 10 and 11, and then the hook 401 is extended outwardly from the frame-side through-hole 600 by means of the elastic force of the coil spring 500. As a result, the battery pack 10 is pushed toward the rear of the terminal body 1 along the guide surface 401a of the hook 401 so that the battery pack 10 is popped out of the battery pack space 1b of the terminal body 1.

As shown in FIG. 11, the battery pack 10 is raised from the battery pack space 1b of the rear casing frame 1a to a prescribed height. Consequently, the raised battery pack 10 can be easily separated from the rear casing frame 1a of the terminal body 1.

When the battery pack 10 is to be locked in the battery pack space 1b, as shown in FIGS. 9 and 10, the battery pack 10 is guided along the guide surface of the hook 401, and the hook 401 is engaged into the engaging groove 11 so that the battery pack 10 is securely locked to the rear casing frame 1a of the terminal body 1.

The hook 401 is forced into the frame-side through-hole 600, and is then extended from the frame-side through-hole 600 by means of the elastic force of the coil spring 500 so that the hook 401 is engaged into the engaging groove 11 of the battery pack 10.

As the hole-side inclined surface 403a is slid toward the lower end of the terminal body 1 by means of the elastic force of the coil spring 500, the protrusion-side inclined surface 303a is guided so that the push locker unit 300 is moved toward the rear of the terminal body 1.

As is apparent from the above description, the present invention provides a battery pack locking apparatus for mobile communication terminals that is capable of securely locking a battery pack to a terminal body of a mobile communication terminal when the battery pack is attached to the terminal body of the mobile communication terminal and easily detaching the battery pack from the terminal body once the battery pack locking apparatus is simply pushed, whereby the battery pack is easily attached to or detached from the terminal body of the mobile communication terminal.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A battery pack locking apparatus for locking a battery pack to a battery pack space formed at a rear casing frame of a terminal body of a mobile communication terminal, the battery pack locking apparatus comprising:
    a mounting groove formed on the rear casing frame, wherein said mounting groove is provided at both sides thereof with latch holes, through which hook members formed on a push locker unit are inserted, such that the hook members are retained within the corresponding latch holes;
    a push locker unit mounted in the mounting groove such that the push locker unit can be moved toward the front and the rear of the terminal body when the push locker unit is pushed;
    a slide locker unit coupled with the push locker unit at a lower part of the push locker unit such that the slide locker unit can slide toward the upper and lower ends of the terminal body, as the push locker unit is moved toward the front and the rear of the terminal body, to facilitate locking the battery pack to the battery pack space or popping the battery pack out of the battery pack space when the battery pack is unlocked from the battery pack space; and
    a coil spring mounted to the slide locker unit for providing an elastic force so that the push locker unit is moved toward the front and the rear of the terminal body and the slide locker unit is slid toward the upper and lower ends of the terminal body.

2. The apparatus as set forth in claim 1, wherein
    the mounting groove is provided at a middle part thereof with a through-hole, through which a guide protrusion formed on the push locker unit is inserted,
    a supporting plate is provided at an upper end of the bottom of the mounting groove, the supporting plate extending toward the front of the terminal body for movably supporting a spring protrusion formed on the slide locker unit, and
    separation-preventing protrusions are formed adjacent to the mounting groove, the separation-preventing protrusions being securely engaged with latch protrusions formed on the slide locker unit, for preventing separation of the slide locker unit from the mounting groove.

3. The apparatus as set forth in claim 2, wherein the supporting plate has a plate-side through-hole formed there through such that the spring protrusion of the slide locker unit is movably inserted through the plate-side through-hole.

4. The apparatus as set forth in claim 2, wherein the slide locker unit is provided at both sides thereof with latch protrusions so that the separation-preventing protrusions formed adjacent to the mounting groove are securely engaged with the latch protrusions.

5. The apparatus as set forth in claim 1, wherein the push locker unit comprises:
    a locker button that is exposed when mounted in the mounting groove;
    hook members formed at both sides of the bottom of the locker button and extending from the locker button such that the hook members can be inserted through the latch holes of the mounting groove, the hook members being retained within the corresponding latch holes; and
    a guide protrusion formed between the hook members and being inserted though a through-hole formed at a middle part of the mounting groove, the guide protrusion having a protrusion-side inclined surface corresponding to a hole-side inclined surface formed on the slide locker unit.

6. The apparatus as set forth in claim 5, wherein the slide locker unit is provided at the middle part thereof with a guide hole having a hole-side inclined surface corresponding to the protrusion-side inclined surface of the guide protrusion.

7. The apparatus as set forth in claim 5, wherein the guide protrusion of the push locker unit is moved toward the front and the rear of the terminal body when the push locker unit is pushed or when the battery pack is locked to or unlocked from the battery pack space, and the protrusion-side inclined surface is guided along the hole-side inclined surface so that the slide locker unit is slid toward the upper and lower ends of the terminal body.

8. The apparatus as set forth in claim 1, wherein
the slide locker unit is provided at one end thereof with a hook, the hook being engaged into or disengaged from an engaging groove formed on the battery pack as the slide locking unit is slid toward the upper and lower ends of the terminal body, and
the slide locker unit is provided at the other end thereof with a spring protrusion extending in the longitudinal direction of the slide locker unit such that the coil spring is fitted on the spring protrusion.

9. The apparatus as set forth in claim 8, wherein the hook has a guide surface formed at one end thereof such that the hook is guided along the guide surface when the hook is engaged into or disengaged from the engaging groove of the battery pack.

10. The apparatus as set forth in claim 9, wherein the guide surface is inclined.

11. The apparatus as set forth in claim 10, wherein the rear casing frame has a frame-side through-hole, through which the hook is inserted toward the inside of the battery pack locking space.

12. A battery pack locking apparatus for locking a battery pack to a terminal body of a mobile communication terminal, comprising:

a push locker unit mounted in a mounting groove for movement in a first direction perpendicular to a longitudinal axis of the terminal body, the mounting groove formed on a rear casing frame of the terminal body and the mounting groove being provided at both sides thereof with latch holes through which hook members formed on the push locker unit are inserted such that the hook members are retained within the corresponding latch holes: and a slide locker unit, having latch protrusions on both sides, coupled to the push locker unit for sliding movement in a second direction along the longitudinal axis of the terminal body, the slide locker unit including a hook for engaging a groove in the battery pack to lock the battery pack to the terminal, wherein movement of the push locker unit in the first direction causes movement of the slide locker unit in the second direction.

13. The apparatus as set forth in claim 12, wherein the first direction is substantially perpendicular to the second direction.

* * * * *